US008892270B2

(12) United States Patent
Engstrand

(10) Patent No.: US 8,892,270 B2
(45) Date of Patent: Nov. 18, 2014

(54) SYSTEM AND METHOD FOR OBTAINING, TRANSMITTING AND/OR PROVIDING FREIGHT TRANSPORTATION INFORMATION

(71) Applicant: Bradley W. Engstrand, Hartford, WI (US)

(72) Inventor: Bradley W. Engstrand, Hartford, WI (US)

(73) Assignee: Phaedrus, LLC, Hartford, WI (US)

( * ) Notice: Subject to any disclaimer, the term of this patent is extended or adjusted under 35 U.S.C. 154(b) by 80 days.

(21) Appl. No.: 13/668,997

(22) Filed: Nov. 5, 2012

(65) Prior Publication Data

US 2014/0129046 A1 May 8, 2014

(51) Int. Cl.
G05D 1/00 (2006.01)
G05D 3/00 (2006.01)
G01G 3/12 (2006.01)
G01L 7/04 (2006.01)
G01G 19/12 (2006.01)
G06F 15/00 (2006.01)

(52) U.S. Cl.
CPC ............... *G06F 15/00* (2013.01); *G01G 3/125* (2013.01); *G01L 7/045* (2013.01); *G01G 19/12* (2013.01)
USPC .......................................................... 701/1

(58) Field of Classification Search
CPC .... G07C 5/008; G07C 5/0808; G07C 5/0816; G07C 5/085
USPC .......................................................... 701/1
See application file for complete search history.

(56) References Cited

U.S. PATENT DOCUMENTS

| | | |
|---|---|---|
| 3,368,751 A | 2/1968 | Merrill |
| 3,885,872 A | 5/1975 | Howe, Jr. et al. |
| 4,150,299 A | 4/1979 | Kaslewicz et al. |
| 4,501,642 A | 2/1985 | Wells |
| 4,661,695 A | 4/1987 | Morl et al. |
| 4,736,674 A | 4/1988 | Stoll |
| 4,806,707 A | 2/1989 | Landmeier |
| 4,902,903 A | 2/1990 | Segerson et al. |
| 4,970,361 A | 11/1990 | Fuse |
| 5,182,979 A | 2/1993 | Morgan |
| 5,231,959 A | 8/1993 | Smletana |
| 5,271,505 A | 12/1993 | Low |
| 5,705,742 A | 1/1998 | Fox et al. |
| 5,744,705 A | 4/1998 | Derouen et al. |
| 5,799,626 A | 9/1998 | Ponsford et al. |
| 5,977,778 A | 11/1999 | Chan et al. |
| 5,988,676 A | 11/1999 | Lotito et al. |
| 6,058,776 A | 5/2000 | Algers et al. |
| 6,170,573 B1 | 1/2001 | Brunet et al. |
| 6,952,009 B1 | 10/2005 | Engstrand |

(Continued)

Primary Examiner — Mary Cheung
Assistant Examiner — Frederick Brushaber
(74) Attorney, Agent, or Firm — Patents+TMS, P.C.

(57) ABSTRACT

An apparatus, a system and a method obtain, transmit and/or provide transportation information. A microprocessor is configured to receive and/or transmit real time information concerning the operation of a vehicle. Real time information, such as, for example, a weight of a vehicle, an air pressure of tires, a location of the truck and the trailer, brake wear of brakes of the truck and/or the trailer, and/or engine measurements may be obtained. The real time information may be encrypted and may be transmitted to a central location using Wi-Fi communication, a cellular telephone network, radio transmission, a transponder, and/or the like. The real time information may be accessed by a terminal communicatively linked to the microprocessor and/or the central location. The signal may indicate vehicle compliance and/or non-compliance with a private commercial requirement and/or state and federal regulations.

19 Claims, 1 Drawing Sheet

(56) References Cited

U.S. PATENT DOCUMENTS

| | | |
|---|---|---|
| 7,294,823 B2 | 11/2007 | Engstrand |
| 7,388,188 B2 | 6/2008 | Engstrand |
| 2004/0148083 A1* | 7/2004 | Arakawa et al. ............... 701/50 |
| 2005/0187675 A1* | 8/2005 | Schofield et al. ............... 701/2 |
| 2007/0073473 A1* | 3/2007 | Altan et al. ................. 701/207 |
| 2007/0075226 A1* | 4/2007 | Engstrand ................. 250/231.1 |
| 2007/0075229 A1* | 4/2007 | Engstrand ................. 250/231.1 |
| 2008/0312786 A1* | 12/2008 | Day ............................. 701/33 |
| 2008/0319602 A1* | 12/2008 | McClellan et al. ............ 701/33 |
| 2008/0319604 A1* | 12/2008 | Follmer et al. ................ 701/35 |
| 2009/0024273 A1* | 1/2009 | Follmer et al. ................ 701/35 |

* cited by examiner

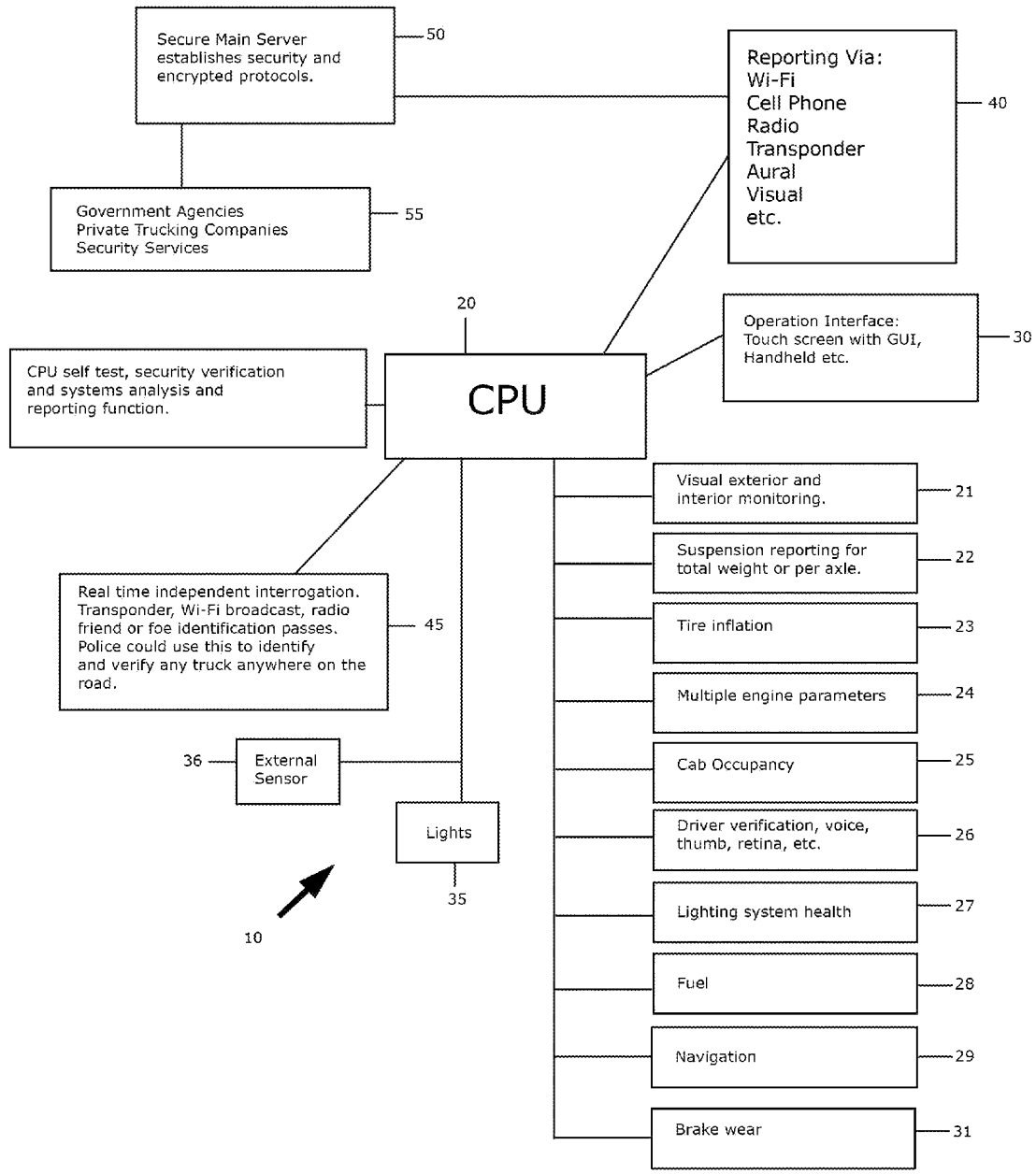

ized containers within the trailer, and/or differently
SYSTEM AND METHOD FOR OBTAINING, TRANSMITTING AND/OR PROVIDING FREIGHT TRANSPORTATION INFORMATION This application claims the benefit of U.S. Provisional Application Ser. No. 61/628,643 filed Nov. 3, 2011.

BACKGROUND OF THE INVENTION

The present invention generally relates to a system and a method for obtaining, transmitting and/or providing freight transportation information. More specifically, the present invention relates to a system and a method which obtain real time information, such as, for example, a total weight of a truck and a trailer, a per axle weight, an air pressure of tires, measurement of brake wear, a location of the truck and the trailer, and/or engine measurements.

Goods transported for commercial gain, also known as "freight," may be transported by a truck. Typically, the freight is loaded into a trailer which is connected to the truck. The primary focus of the driver is avoiding collision of the truck and the trailer with another moving object or a stationary object.

However, the maneuverability of a truck-trailer combination may be compromised by the size and the weight of the truck-trailer combination. For example, the length of the trailer typically creates difficulty in viewing areas proximate to the trailer and determining the location of the back of the trailer. In addition, the truck-trailer combination may have a complex design which causes a variety of factors to affect maneuverability; for example, the truck-trailer combination may have several axles, more than one trailer, differently sized containers within the trailer, and/or differently weighted containers within the trailer. Moreover, the difficulty involved in driving a truck-trailer combination is enhanced by the increased traffic congestion on roads, differences between trucks employed to move the freight, differences between trailers employed to move the freight, and deteriorating infrastructure of highways and bridges due to smaller government budgets.

In addition to driving the truck-trailer combination, the driver may be responsible for other tasks related to transporting the freight. For example, the driver may be required to stop at weigh stations periodically to ensure that the weight of the truck-trailer combination complies with state and federal regulations. As another example, the truck driver may need to check parameters related to operation of the truck-trailer combination, such as, for example, air pressure in the tires of the truck-trailer combination, measurement of brake wear of the truck-trailer combination, engine measurements, the organization of the freight in the trailer, and/or the like. As yet another example, the truck driver may be required to identify the location of the truck-trailer combination periodically so that the carrier service, the provider of the freight and/or the recipient of the freight are aware of the progress of the freight toward the destination. As yet another example, the truck driver may need to identify the most expedient route to the destination from a variety of possible routes and then periodically confirm that the truck-trailer combination stays on that route.

For safety and expedience of transport, it would be advantageous if the tasks of the truck driver which are additional relative to driving the truck-trailer combination may be performed automatically without expenditure of time or effort of the truck driver.

SUMMARY OF THE INVENTION

The present invention generally relates to a system and a method for obtaining, transmitting and/or providing freight transportation information. More specifically, the present invention relates to a system and a method which obtain real time information, such as, for example, a weight of a truck and a trailer, a per axle weight, an air pressure of tires, measurement of brake wear, a location of the truck and the trailer, and/or engine measurements. The real time information may be encrypted and may be transmitted to a central location using Wi-Fi communication, a cellular telephone network, a radio-frequency transmission, a transponder, and/or the like.

It is, therefore, an advantage of the present invention to provide a system and a method for obtaining, transmitting and/or providing freight transportation information.

Another advantage of the present invention is to provide a system and a method for obtaining, transmitting and/or providing freight transportation information which may prevent or may minimize the need for a driver to engage in tasks other than driving the truck.

And, another advantage of the present invention is to provide a system and a method for obtaining, transmitting and/or providing freight transportation information which may prevent or may minimize the need for a driver to stop at weigh stations.

Yet another advantage of the present invention is to provide a system and a method for obtaining, transmitting and/or providing freight transportation information which may obtain real time measurements.

And, another advantage of the present invention is to provide a system and a method for obtaining, transmitting and/or providing freight transportation information which may determine whether the truck and/or the trailer are in compliance with state and federal regulations.

Yet another advantage of the present invention is to provide a system and a method for obtaining, transmitting and/or providing freight transportation information which may emit a signal which indicates whether the truck and/or the trailer are in compliance with state and federal regulations.

Another advantage of the present invention is to provide a system and a method for obtaining, transmitting and/or providing freight transportation information which may enable third parties, such as police, to identify the truck, the trailer, the freight and/or the compliance of the truck and/or the trailer with state and federal regulations without stopping the truck and the trailer.

Yet another advantage of the present invention is to provide a system and a method for obtaining, transmitting and/or providing freight transportation information which may encrypt the freight transportation information.

A still further advantage of the present invention is to provide a system and a method for obtaining, transmitting and/or providing freight transportation information which may use an intensity of light to determine a tire pressure, measurement of brake wear, a total weight, a weight per axle, an amount of fuel, and/or lighting functionality.

Moreover, an advantage of the present invention is to provide a system and a method for obtaining, transmitting and/or providing freight transportation information which may determine the identity of the driver.

And, another advantage of the present invention is to provide a system and a method for obtaining, transmitting and/or providing freight transportation information which may obtain real time visual images of the interior of the truck and/or the trailer.

Yet another advantage of the present invention is to provide a system and a method for obtaining, transmitting and/or providing freight transportation information which may obtain real time visual images of areas adjacent to the exterior of the truck and/or the trailer.

Moreover, an advantage of the present invention is to provide a system and a method for obtaining, transmitting and/or providing freight transportation information which may compile real time measurements in a remote server.

And, another advantage of the present invention is to provide a system and a method for obtaining, transmitting and/or providing freight transportation information which may provide real time measurements to a terminal connected to the internet.

Yet another advantage of the present invention is to provide a system and a method for obtaining, transmitting and/or providing freight transportation information which may assist loading of the trailer.

Moreover, an advantage of the present invention is to provide a system and a method for obtaining, transmitting and/or providing freight transportation information which may indicate where freight is to be placed within the trailer.

And, another advantage of the present invention is to provide a system and a method for obtaining, transmitting and/or providing freight transportation information which may improve gas mileage of the truck.

Yet another advantage of the present invention is to provide a system and a method for obtaining, transmitting and/or providing freight transportation information which may prevent overloading of an axle.

Moreover, an advantage of the present invention is to provide a system and a method for obtaining, transmitting and/or providing freight transportation information which may compile a log book of mileage of a driver and/or may emit a signal which conveys the identity of the driver and/or the log book of the driver.

Additional features and advantages of the present invention are described in, and will be apparent from, the detailed description of the presently preferred embodiments and from the drawings.

BRIEF DESCRIPTION OF THE DRAWINGS

FIG. 1 illustrates a black box diagram of a system for obtaining, transmitting and/or using freight transportation information in an embodiment of the present invention.

DETAILED DESCRIPTION OF THE PRESENTLY PREFERRED EMBODIMENTS

The present invention generally relates to a system and a method for obtaining, transmitting and/or providing freight transportation information. More specifically, the present invention relates to a system and a method which obtain real time information, such as, for example, a weight of a truck and a trailer, a per axle weight, an air pressure of tires, a location of the truck and the trailer, and/or engine measurements. The real time information may be encrypted and may be transmitted to a central location using Wi-Fi communication, a cellular telephone network, a radio-frequency transmission, a transponder, and/or the like. The system and the method may emit a signal which may indicate that the truck and the trailer are in compliance with state and federal regulations.

Referring now to the drawings wherein like numerals refer to like parts, FIG. 1 generally illustrates an embodiment of a system 10 for obtaining, transmitting and/or providing freight transportation information. A microprocessor 20 may be physically connected to a truck and/or a trailer transporting freight and/or may be communicatively connected to sensors associated with the truck and/or the trailer. For example, the microprocessor 20 may be communicatively connected to one or more cameras 21, the weight sensor 22, a tire inflation sensor 23, an engine sensor 24, a cab occupancy sensor 25, a driver verification component 26, a lighting functionality sensor 27, a fuel level sensor 28, a navigation component 29 and/or a brake sensor 31. The one or more cameras 21, the weight sensor 22, the tire inflation sensor 23, the engine sensor 24, the cab occupancy sensor 25, the driver verification component 26, the lighting functionality sensor 27, the fuel level sensor 28, the navigation component 29 and/or the brake sensor 31 may be physically connected to and/or may be associated with the truck and/or the trailer.

The microprocessor 20 may execute program instructions provided by a non-transitory computer-readable medium, namely any computer-readable medium which is not merely a transitory, propagating signal, to communicate with the components of the system 10 and perform the actions discussed hereafter. For example, the program instructions may be provided by a computer memory, such as register memory, processor cache, and/or Random Access Memory (RAM). The microprocessor 20 may be physically connected to the truck and/or the trailer; alternatively or additionally, the microprocessor 20 may be located in a dedicated portable device, a mobile telephone, a desktop computer, a laptop computer, an electronic tablet and/or another electronic device.

One or more of the cameras 21 may be located in the interior of the truck and/or the trailer and may obtain real time visual images of the interior of the truck and/or the trailer. For example, one or more of the cameras 21 may obtain real time visual images of the freight located within the interior of the trailer and/or may obtain real time visual images of the driver. One or more of the cameras 21 may be located on the exterior of the truck and/or the trailer and may obtain real time visual images of areas adjacent to the exterior of the truck and/or the trailer. For example, one or more of the cameras 21 may obtain real time visual images of an area adjacent to the back end of the trailer, real time visual images of a "blind spot" of the truck and the trailer which cannot be seen using mirrors affixed to the truck and the trailer, and/or the like. The one or more cameras 21 may transmit and/or may provide the real time visual images to the microprocessor 20 using a wired communication connection and/or a wireless communication connection.

The weight sensor 22 may obtain real time weight measurements, such as a total weight of the truck and/or the trailer and/or a weight per axle. For example, the weight sensor may be a plurality of weight sensors, and each of the plurality of weight sensors may be associated with a different axle. The weight sensor 22 may transmit and/or may provide the real time weight measurements to the microprocessor 20 using a wired communication connection and/or a wireless communication connection.

The weight sensor 22 may be and/or may have a linear variable differential transformer (LVDT) which measures linear displacement. As known to one having ordinary skill in the art, a LVDT has three solenoidal coils positioned end-to-end wrapping around a tube. A cylindrical ferromagnetic core may slide along the axis of the tube. An alternating current is driven through the central solenoid coil to induce a voltage in each of the outer solenoid coils. As the ferromagnetic core moves, the voltages induced in the outer solenoid coils change. The solenoid coils are connected in reverse series, so that the output voltage is the difference between the voltages of the outer solenoid coils. The magnitude of the output voltage is proportional to the distance moved by the ferromagnetic core, and the phase of the output voltage indicates the direction of the displacement. The ferromagnetic core may be connected to the truck and/or the trailer so that the weight of the truck and/or the trailer may displace, the ferromagnetic core and the output voltage may correspond to the weight.

Alternatively or additionally, the weight sensor 22 may be and/or may have a potentiometer. As known to one having ordinary skill in the art, a potentiometer is a three-terminal resistor with a sliding contact that forms an adjustable voltage divider, and the resistance value of the potentiometer may be adjusted by moving the sliding contact. The sliding contact may be connected to the truck and/or the trailer so that the weight of the truck and/or the trailer may move the sliding contact and the resistance value may correspond to the weight.

Alternatively or additionally, the weight sensor 22 may be and/or may have a pivoting arm and a Hall effect sensor. As known to one having ordinary skill in the art, a Hall effect sensor is a transducer that varies an output voltage in response to a magnetic field. The arm may be connected to the truck and/or the trailer so that the weight of the truck and/or the trailer pivots the arm, and the position of the arm may affect the magnetic field proximate to the Hall effect sensor. The output voltage of the Hall effect sensor may correspond to the weight.

Alternatively or additionally, the weight sensor 22 may be and/or may have an LED and/or a light detector which may determine the volume of a compartment and/or a position of a movable element within a compartment as disclosed in U.S. Pat. Nos. 7,935,916; 7,703,279; 7,518,100; 7,476,842; 7,468,522; 7,456,385; 7,388,188; 7,348,542; 7,291,830; 7,180,053; and 6,952,009, incorporated by reference in their entireties. The movable element may be connected to the truck and/or the trailer so that the weight of the truck and/or the trailer displaces the movable element within the compartment. An intensity of light within the compartment may correspond to the weight. The present invention is not limited to a specific embodiment of the weight sensor 22.

The tire inflation sensor 23 may obtain real time measurements of tire pressure for tires connected to the truck and/or the trailer. For example, the tire inflation sensor 23 may be a plurality of tire inflation sensors, and each of the plurality of tire inflation sensors may be associated with a different tire. The tire inflation sensor 23 may be internal and/or external to the tires. The tire inflation sensor 23 may have and/or may be one or more direct sensors such that the tire inflation sensor 23 physically measures the tire pressure. The tire inflation sensor 23 may have and/or may be one or more indirect sensors such that the tire inflation sensor 23 calculates the tire pressure using the rotational speed of the tire, the vibrations of the tire, and/or the like. The tire inflation sensor 23 may transmit and/or may provide the real time tire pressure measurements to the microprocessor 20 using a wired communication connection and/or a wireless communication connection.

In an embodiment, the tire inflation sensor 23 may be and/or may have an LED and/or a light detector which may determine a volume of a compartment as disclosed in U.S. Pat. Nos. 7,935,916; 7,703,279; 7,518,100; 7,476,842; 7,468,522; 7,456,385; 7,388,188; 7,348,542; 7,291,830; 7,180,053; and 6,952,009, incorporated by reference in their entireties. An intensity of light within the tire may correspond to the volume of the tire and, therefore, the tire pressure. The present invention is not limited to a specific embodiment of the tire inflation sensor 23.

The engine sensor 24 may obtain real time measurements of engine parameters for the truck. For example, the engine sensor 24 may have and/or may be a crankshaft position sensor, an engine coolant temperature sensor, an exhaust gas temperature gauge, a manifold absolute pressure sensor, a mass flow sensor, a nitrogen oxide sensor, an oxygen sensor, a throttle position sensor, and/or the like. The engine sensor 24 may transmit and/or may provide the real time engine parameters to the microprocessor 20 using a wired communication connection and/or a wireless communication connection. The present invention is not limited to a specific embodiment of the engine sensor 24.

The cab occupancy sensor 25 may determine if the driver is present in or absent from the truck. For example, the cab occupancy sensor 25 may have and/or may be a sensor located within the driver's seat of the truck which detects downward pressure on the driver's seat. As another example, the cab occupancy sensor 25 may be a motion sensor which detects motion within the truck. The cab occupancy sensor 25 may indicate if the driver is present in or absent from the truck to the microprocessor 20 using a wired communication connection and/or a wireless communication connection. The present invention is not limited to a specific embodiment of the cab occupancy sensor 25.

The driver verification component 26 may determine the identity of the driver, and/or the microprocessor 20 may use the driver verification component 26 to determine the identity of the driver. For example, the driver verification component 26 may obtain an audio clip of the driver speaking, may obtain a fingerprint, may perform a retinal scan, and/or the like. The driver verification component 26 may transmit and/or may provide the audio clip, the fingerprint, the retinal scan and/or the like to the microprocessor 20 using a wired communication connection and/or a wireless communication connection. The driver verification component 26 and/or the microprocessor 20 may perform voice recognition, fingerprint analysis, retinal scan analysis and/or the like to determine the identity of the driver. The present invention is not limited to a specific embodiment of the driver verification component 26.

The lighting functionality sensor 27 may obtain real time measurements of lighting for the truck and/or the trailer. For example, the lighting functionality sensor 27 may have and/or may be a light detector which measures an intensity of light emitted by the headlights, the brakelights and/or other lights of the truck and/or the trailer. The lighting functionality sensor 27 may transmit and/or may provide the intensity of light to the microprocessor 20 using a wired communication connection and/or a wireless communication connection. The microprocessor 20 may use the intensity of light to identify a malfunction in one of the lights of the truck and/or the trailer. The present invention is not limited to a specific embodiment of the lighting functionality sensor 27.

The fuel level sensor 28 may obtain real time measurements of the amount of fuel in a fuel tank the truck and/or the trailer. For example, the fuel level sensor 2B may have and/or may be a float connected to a metal rod mounted to a variable resistor. Alternatively or additionally, the fuel level sensor 28 may be and/or may have an LED and/or a light detector which may determine a volume of a movable element within a compartment as disclosed in U.S. Pat. Nos. 7,935,916; 7,703,279; 7,518,100; 7,476,842; 7,468,522; 7,456,385; 7,388,188; 7,348,542; 7,291,830; 7,180,053; and 6,952,009, incorporated by reference in their entireties. An intensity of light within the fuel tank may correspond to the amount of fuel in the fuel tank. The lighting functionality sensor 27 may transmit and/or may provide the real time measurements of the amount of fuel to the microprocessor 20 using a wired communication connection and/or a wireless communication connection. The present invention is not limited to a specific embodiment of the fuel level sensor 28.

The navigation component 29 may obtain real time measurements of the location of the truck and/or the trailer. For example, the navigation component 29 may have and/or may be a global positioning system (GPS) receiver. As known to one having ordinary skill in the art, a GPS receiver calculates a current location by timing the signals sent by GPS satellites orbiting the Earth. Each satellite continually transmits messages that include the time the message was transmitted, orbital information, and information regarding the orbits of all other GPS satellites. The GPS receiver uses the messages to determine the transit time of each message and then computes the distance to each satellite. These distances and the locations of the satellites locations are used in an algorithm to calculate the position of the GPS receiver. The GPS receiver may be physically connected to the truck and/or the trailer. The navigation component 29 may transmit and/or may provide the current location to the microprocessor 20 using a wired communication connection and/or a wireless communication connection. The present invention is not limited to a specific embodiment of the navigation component 29.

The brake sensor 31 may obtain real time measurements of the amount of brake wear of the brake drums, brake pads and/or brake discs of the truck and/or the trailer. For example, the brake sensor 31 may have and/or may be associated, mounted or otherwise placed in a brake chamber to obtain the real time measurements. Alternatively or additionally, the brake sensor 31 may be and/or may have an LED and/or a light detector which may determine a volume of a movable element and/or light reflection within the brake chamber or other compartment associated with the brakes to determine the brake wear as disclosed in U.S. Pat. Nos. 7,935,916; 7,703,279; 7,518,100; 7,476,842; 7,468,522; 7,456,385; 7,388,188; 7,348,542; 7,291,830; 7,180,053; and 6,952,009, incorporated by reference in their entireties. An intensity of light within the brake chamber may correspond to the amount of wear associated with the brake drums, brake pads and/or brake discs. The brake sensor 31 may transmit and/or may provide the real time measurements of the brake wear to the processor 20 using a wired communication connection and/or a wireless communication connection. The present invention is not limited to a specific embodiment of the brake sensor 31.

The microprocessor 20 may use the navigation component 29 to record mileage of the truck and/or the trailer. In an embodiment, the microprocessor 20 may be programmed to have an internal clock and/or access an external clock, such as a remotely located clock. The microprocessor 20 may determine the time continuously and/or periodically. The microprocessor 20 may record the mileage of the truck and/or the trailer in association with time periods to create a log book. In an embodiment, the log book may be associated with the identity of the driver determined by the driver verification component 26.

The microprocessor 20 may be electrically connected to a display screen 30 which may display the real time visual images of the interior of the truck and/or the trailer, the mileage associated with a time period, the real time visual images of areas adjacent to the exterior of the truck and/or the trailer, the real time weight measurements, the real time measurements of tire pressure, the real time measurements of the engine parameters, the real time measurements of lighting, the real time measurements of the amount of fuel, the real time measurements of the location, and/or the like. The display screen 30 may be physically connected to the truck and/or the trailer; for example, the display screen 30 may be physically connected to the steering wheel and/or the dashboard of the truck. Alternatively or additionally, the display screen 30 may be portable such that the display screen 30 resides in a handheld device.

The display screen 30 may accept user input. For example, the display screen 30 may display a list of data categories, and the display screen may respond to the driver selecting a category from the list by displaying information corresponding to the selected category. For example, the driver may provide user input that selects "fuel level" from the list, and the display screen 30 may display the real time measurement of the fuel level in response. As another example, the driver may provide user input that selects "location" from the list, and the display screen 30 may display the current location determined by the navigation component 29 in response. As yet another example, the driver may provide user input that selects "weight" from the list, and the display screen 30 may display the total weight of the truck and/or the trailer and/or the weight per axle determined by the weight sensor 22 in response. In an embodiment, the display screen 30 may be a touchscreen which enables the user input to be provided by touching and/or making gestures on the display screen 30. In an embodiment, the display screen 309 may continuously display the real time measurements.

The display screen 30 may display directions and/or a map directing the driver to the destination. For example, the microprocessor 20 may use the location determined by the navigation component 29 to determine the directions and/or the map, and then the display screen 30 may display the directions and/or the map. The navigation component 29 and/or the microprocessor 20 may periodically and/or continuously monitor the location. The navigation component 29 and/or the microprocessor 20 may periodically and/or may continuously compare the location to the directions and/or the map so that the directions and/or the map may be periodically and/or continuously updated.

The microprocessor 20 may be communicatively connected to a lighting system 35 which may be located in the interior of the trailer. The lighting system 35 may emit a light which may indicate where freight is to be positioned within the trailer. For example, as the freight is loaded into the trailer, the microprocessor 20 may use the per axle weight determined by the weight sensor 22 to determine an optimal position for a piece of freight. The microprocessor 20 may have the lighting system 35 emit a light directed at the optimal position for the piece of freight. As a result, the lighting system 35 may prevent an axle from being overloaded.

In an embodiment, the lighting system 35 may use color-coded lighting. For example, the lighting system 35 may emit a green light directed at the optimal position for the piece of freight, may emit a yellow light at an acceptable position for the piece of freight, and/or may emit a red light directed at the worst position for the piece of freight. The present invention is not limited to a specific color of the light emitted by the lighting system 35.

In an embodiment, the microprocessor 20 may be communicatively connected to an external sensor 36 which may be located externally relative to the truck and the trailer. For example, the external sensor 36 may be physically connected to a forklift so that the external sensor 36 measures a weight of a piece of freight moved by the forklift. The external sensor 36 may transmit the weight to the microprocessor 20 so that the microprocessor 20 may determine the optimal position, the acceptable position and/or the worst position for the piece of freight within the trailer. The microprocessor 20 may then direct the lighting system 35 to emit light accordingly. In an embodiment, the external sensor 36 may continuously transmit weights to the microprocessor 20 to enable the microprocessor to calculate the total weight loaded into the trailer. The present invention is not limited to a specific embodiment or a specific location of the external sensor 36.

The microprocessor 20 may be communicatively connected to a server 50 located remotely from the microprocessor 20, the truck and/or the trailer. For example, the microprocessor 20 may have communication means 40 which enables the microprocessor to wirelessly communicate with the server 50. In an embodiment, the communication means 40 may be bidirectional so that the microprocessor may send messages to the server 50 and the server may send messages to the microprocessor 20. The communications means 40 may use, for example, a Wi-Fi communication, a cellular telephone network, a radio-frequency transmission, aural communication, visual communication, and/or the like. In an embodiment, the communication means 40 may transmit a signal to a transponder which receives and/or amplifies the signal and then transmits the signal to the server on a different frequency. The present invention is not limited to a specific embodiment or a specific location of the communication means 40.

In an embodiment, the microprocessor 20 and/or the communication means 40 may encrypt the signal before transmitting the signal to the server 50. The server 50 may decrypt the signal after receiving the signal. For example, the microprocessor 20, the communication means 40 and/or the server 50 may use an asymmetric key algorithms, such as public-key cryptography, and/or a symmetric key algorithm to encrypt and/or decrypt the signal. The microprocessor 20 may use the communication means 40 to transmit to the server 50 whether the driver is present in or absent from the truck, the identity of the driver, the real time visual images of the interior of the truck and/or the trailer, the real time visual images of areas adjacent to the exterior of the truck and/or the trailer, the real time weight measurements, the real time measurements of tire pressure, the real time measurements of the engine parameters, the real time measurements of lighting, the real time measurements of the amount of fuel, the real time measurements of the location, and/or the like.

The microprocessor 20 may compare predetermined thresholds to the measurements obtained by one or more cameras 21, the weight sensor 22, the tire inflation sensor 23, the engine sensor 24, the cab occupancy sensor 25, the driver verification component 26, the lighting functionality sensor 27, the fuel level sensor 28, the navigation component 29 and/or the brake sensor 31. The microprocessor 20 may use the comparison to determine whether the truck and/or the trailer are in compliance with state and federal regulations. In an embodiment, the microprocessor 20 may output a first signal and/or a second signal using the communication means 40; the first signal may indicate compliance of the truck and/or the trailer with state and federal regulations, and the second signal may indicate non-compliance of the truck and/or the trailer with state and federal regulations.

In an embodiment, the microprocessor 20 may use the location determined by the navigation component 29 to select the state regulations for the state which contains the location, and then use the selected state regulations to determine whether the truck and/or the trailer are in compliance with state and federal regulations. For example, the microprocessor 20 may access a remote database, such as the server 50, to access a plurality of state regulations; each of the state regulations may correspond to one or more states, and the microprocessor 20 may use the location determined by the navigation component 29 to select the state regulations for the state which contains the location. As another example, the microprocessor 20 may be programmed with a plurality of state regulations; each of the state regulations may correspond to one or more states, and the microprocessor 20 may use the location determined by the navigation component 29 to select the state regulations for the state which contains the location.

In an embodiment, a first terminal 45 may directly obtain the signal emitted by the microprocessor 20 and/or the communication means 40. For example, the microprocessor 20 and/or the communication means 40 may continuously and/or periodically emit the signal. As another example, the first terminal may transmit a request to the microprocessor 20, and the microprocessor 20 may respond to the request by emitting the signal. The first terminal 45 may be, for example, a dedicated portable device, a dedicated stationary device, a mobile telephone, a desktop computer, a laptop computer, an electronic tablet and/or another electronic device.

The first terminal 45 may determine if the truck and/or the trailer are in compliance with state and federal regulations or not in compliance with state and federal regulations by receiving the signal. In an embodiment, the signal may identify the driver, the mileage, the log book, the truck, the trailer and/or the freight. Therefore, the first terminal 45 may enable third parties, such as police, to identify the driver, the mileage, the log book, the truck, the trailer, the freight and/or the compliance with state and federal regulations of the truck and/or the trailer. In an embodiment, the first terminal may be authorized to receive and/or decrypt the signal emitted by the microprocessor 20 and/or the communication means 40 if the first terminal 45 and/or a user of the first terminal 45 has a subscription and/or paid a subscription fee.

The server 50 may maintain records of the real time measurements received from the microprocessor 20. A second terminal 55 may access the records. For example, the second terminal 55 may be connected to the internet and/or may use the internet to download an application which enables the second terminal 55 to communicate with and/or obtain the records from the server 50. The second terminal 55 may use a web browser and/or a webpage displayed in the web browser to communicate with and/or obtain the records from the server 50. The second terminal 55 may be a mobile telephone, a desktop computer, a laptop computer, an electronic tablet and/or another electronic device. The second terminal 55 may be used by a government agency, such as the Department of Transportation, the Department of Homeland Security and/or the like; private trucking companies, such as the carrier transporting the freight; security services, such as a private security company monitoring the status of the freight; and/or the like. In an embodiment, the second terminal 55 may be authorized to access the server 50 if the second terminal 55 and/or a user of the second terminal 55 has a subscription and/or paid a subscription fee.

In an embodiment, the microprocessor 20 may "self-test" itself to ensure functionality of the microprocessor 20 and/or the system 10. For example, the microprocessor 20 may confirm that a secure communication connection with the server 50 is maintained. As another example, the microprocessor 20 may confirm that the microprocessor 20 is communicatively connected to the lighting system 35, the external sensor 36, the one or more cameras 21, the weight sensor 22, the tire inflation sensor 23, the engine sensor 24, the cab occupancy sensor 25, the driver verification component 26, the lighting functionality sensor 27, the fuel level sensor 2B, the navigation component 29 and/or the brake sensor 31. As yet another example, the microprocessor 20 may confirm that the microprocessor 20 is communicatively connected to the server 50.

Accordingly, the system 10 may enable the freight information to be obtained in real time measurements. The freight information may be displayed to the driver by a display screen 30, may be compiled by the server 50 located remotely from the truck and the trailer, may be displayed to a third party which has a first terminal 45 which receives a signal emitted by the processor 20 and/or the communication means 40, and may be displayed to a third party which has a second terminal 55 connected to the server 50 by the internet.

Various changes and modifications to the presently preferred embodiments described herein will be apparent to those skilled in the art. Such changes and modifications may be made without departing from the spirit and scope of the present invention and without diminishing its attendant advantages.

I claim:

1. A system for obtaining real time information associated with a vehicle transporting freight wherein the vehicle has a compartment with a volume wherein the volume varies in the compartment, the system comprising:
    a light source and a light detector associated with the vehicle wherein the light source provides a light in the compartment and the light detector measures an intensity of the light from within the compartment wherein the intensity of the light corresponds to the volume of the compartment and further wherein the light detector produces a signal indicative of the real time information associated with the vehicle; and
    a microprocessor that receives the signal from the light detector to process the signal to determine the volume of the compartment wherein the volume of the compartment corresponds to the real time information and further wherein the microprocessor transmits the signal to a remote location.

2. The system of claim 1 wherein the compartment is an interior of a tire of the vehicle and further wherein the real time information is pressure of the tire of the vehicle.

3. The system of claim 1 wherein the compartment is an interior of a fuel tank of the vehicle and further wherein the real time information is amount of fuel in the fuel tank of the vehicle.

4. The system of claim 1 wherein the compartment is an interior of a brake chamber on the vehicle and further wherein the real time information is amount of brake wear to brakes of the vehicle.

5. The system of claim 1 further comprising:
    a visual display in the vehicle to display the real time information.

6. The system of claim 1 wherein the light source is an LED associated with the light detector.

7. The system of claim 1 further comprising:
    a freight placement indicator connected to the microprocessor wherein the microprocessor determines an optimal position for a piece of freight and causes the freight placement indicator to indicate where to position the freight within the vehicle.

8. A method for obtaining real time information associated with a variable parameter of a vehicle transporting freight wherein the vehicle has a region with a volume wherein the volume changes in the region, the method comprising the steps of:
    transmitting light in the region of the vehicle;
    detecting the light in the region to produce a signal associated with the transmitted light in the region of the vehicle;
    processing the signal to determine a change in the variable parameter of the vehicle associated with the volume of the region; and
    generating the real time information based upon the change in the variable parameter of the vehicle.

9. The method of claim 8 further comprising the step of: encrypting the real time information.

10. The method of claim 8 further comprising the step of: transmitting the signal to a location remote from the vehicle.

11. The method of claim 8 further comprising the step of: displaying the change in the variable parameter of the vehicle.

12. The method of claim 8 wherein the region of the vehicle is an interior of a tire of the vehicle.

13. The method of claim 8 wherein the region of the vehicle is a compartment holding freight transported by the vehicle.

14. The method of claim 8 wherein the region of the vehicle is an interior of a fuel tank of the vehicle.

15. The method of claim 8 wherein the signal is indicative of weight in a compartment of the vehicle.

16. The method of claim 8 wherein the signal is processed to determine compliance with a regulation.

17. The method of claim 8 wherein the region of the vehicle is a brake chamber of the vehicle.

18. A system for obtaining real time information associated with a vehicle transporting freight wherein the vehicle has a compartment with a movable element within the compartment wherein a position of the movable element varies with a load carried in the compartment, the system comprising:
    a light source and a light detector associated with the vehicle wherein the light source provides a light in the compartment and the light detector measures an intensity of the light from within the compartment wherein the intensity of the light corresponds to a position of the movable element within the compartment and further wherein the light detector produces a signal indicative of the real time information associated with the vehicle; and
    a microprocessor that receives the signal from the light detector to process the signal to determine the position of the movable element within the compartment wherein the position of the movable element within the compartment corresponds to the real time information and further wherein the microprocessor transmits the signal to a remote location.

19. The system of claim 18 wherein the movable element is connected to the vehicle and configured such that weight of the freight displaces the movable element within the compartment and further wherein the real time information is weight of the freight.

* * * * *